(12) United States Patent
Mizutani et al.

(10) Patent No.: US 8,477,363 B2
(45) Date of Patent: Jul. 2, 2013

(54) TABLE DATA PROCESSING APPARATUS FOR CREATING TABLE DATA CONTAINING COMPLETE FORMULAS

(75) Inventors: Norio Mizutani, Mie-ken (JP); Hiroshi Hattori, Gifu-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 424 days.

(21) Appl. No.: 12/853,641

(22) Filed: Aug. 10, 2010

(65) Prior Publication Data

US 2011/0032555 A1 Feb. 10, 2011

(30) Foreign Application Priority Data

Aug. 10, 2009 (JP) ................. 2009-185511

(51) Int. Cl.
*H04N 1/387* (2006.01)
*G06K 15/02* (2006.01)
*G06F 3/12* (2006.01)
*G06F 17/00* (2006.01)
*G06F 17/21* (2006.01)
*G06F 17/24* (2006.01)

(52) U.S. Cl.
CPC ............ *G06F 17/211* (2013.01); *G06F 17/246* (2013.01)
USPC ............ 358/1.2; 358/1.18; 715/212; 715/273

(58) Field of Classification Search
USPC . 358/1.2, 1.11, 1.18, 449–453; 715/212–220, 715/273, 274
See application file for complete search history.

(56) References Cited

U.S. PATENT DOCUMENTS

| | | | | |
|---|---|---|---|---|
| 5,835,916 A | * | 11/1998 | Inaki et al. | 715/212 |
| 6,981,209 B1 | * | 12/2005 | Parikh et al. | 715/212 |
| 7,627,812 B2 | * | 12/2009 | Chamberlain et al. | 715/217 |
| 7,640,499 B2 | * | 12/2009 | Kato | 715/273 |
| 7,757,161 B2 | * | 7/2010 | Wheadon et al. | 358/1.18 |
| 7,770,100 B2 | * | 8/2010 | Chamberlain et al. | 715/217 |
| 7,792,847 B2 | * | 9/2010 | Dickerman et al. | 707/756 |
| 8,286,072 B2 | * | 10/2012 | Chamberlain et al. | 715/215 |
| 2002/0023105 A1 | * | 2/2002 | Wisniewski | 707/503 |
| 2002/0184261 A1 | * | 12/2002 | Yamane | 707/503 |
| 2004/0111666 A1 | * | 6/2004 | Hollcraft | 715/503 |
| 2006/0015804 A1 | * | 1/2006 | Barton et al. | 715/503 |
| 2007/0268522 A1 | * | 11/2007 | Miyamoto | 358/1.18 |

(Continued)

FOREIGN PATENT DOCUMENTS

| | | |
|---|---|---|
| JP | 8-305777 | 11/1996 |
| JP | 10-143585 | 5/1998 |

*Primary Examiner* — Scott A Rogers
(74) *Attorney, Agent, or Firm* — Scully, Scott, Murphy & Presser, P.C.

(57) ABSTRACT

A printer includes an input unit, a cell-size changing unit, a print data creating unit, and a printing unit. The input unit receives table data describing a table including a plurality of cells. Each of the plurality of cells has a size. The cell-size changing unit is configured to be capable of changing the size of a cell that is associated with a formula. The print data creating unit creates print data for printing a cell-size changed table that includes the size changed cell in a predetermined part of a recording sheet such that the formula fits entirely within the size changed cell, if the cell-size changing unit changes the size of the cell. The printing unit prints the cell-size changed table based on the print data in the predetermined part of the recording sheet.

11 Claims, 10 Drawing Sheets

U.S. PATENT DOCUMENTS

2008/0148140 A1* 6/2008 Nakano .................. 715/215
2009/0228776 A1* 9/2009 Folting et al. ............. 715/219
2010/0115390 A1* 5/2010 Desantis et al. .......... 715/212

* cited by examiner

FIG.1A

INPUTTED CELLS

| PART NUMBER | NUMBER OF PIECES |
|---|---|
| 3 | 1 |
| 2 | 2 |

| PRODUCT NAME | NUMBER OF PIECES | UNIT PRICE | SUM |
|---|---|---|---|
| PART3 | 1 | 300 | 300 |
| PART2 | 2 | 200 | 400 |
| | | TOTAL | 700 |

LOOK-UP TABLE

| 1 | PART1 | 100 |
|---|---|---|
| 2 | PART2 | 200 |
| 3 | PART3 | 300 |
| 4 | PART4 | 150 |

FIG.1B

| PART NUMBER | NUMBER OF PIECES |
|---|---|
| 3 | 1 |
| 2 | 2 |

| PRODUCT NAME | NUMBER OF PIECES | UNIT PRICE | SUM |
|---|---|---|---|
| =LOOKUP(B4, J3:J6, K3:K) | =C4 | =LOOKUP(B4, J3:J | =F4*G4 |
| =LOOKUP(B5, J3:J6, K3:K) | =C5 | =LOOKUP(B5, J3:J | =F5*G5 |
| | | TOTAL | =SUM(H4:H6) |

| 1 | PART1 | 100 |
|---|---|---|
| 2 | PART2 | 200 |
| 3 | PART3 | 300 |
| 4 | PART4 | 150 |

FIG.5

ROW AND COLUMN NUMBERS

| | A | B | C | D | E | F | G | H | I | J | K | L |
|---|---|---|---|---|---|---|---|---|---|---|---|---|
| 1 | | | | | | | | | | | | |
| 2 | PART | NUMBER | | | PRODUCT NAME | NUMBER OF PIECES | UNIT PRICE | SUM | | 1 | PART1 | 100 |
| 3 | NUMBER | OF | | | | | | | | 2 | PART2 | 200 |
| 4 | 3 | | 1 | | =LOOKUP(B4, J3:J6, K3:K6) | =C4 | =LOOKUP(B4, J3:J6, L3:L6) | =F4*G4 | | 3 | PART3 | 300 |
| 5 | 2 | | 2 | | =LOOKUP(B5, J3:J6, K3:K6) | =C5 | =LOOKUP(B5, J3:J6, L3:L6) | =F5*G5 | | 4 | PART4 | 150 |
| 6 | | | | | | | TOTAL | =SUM(H4:H6) | | | | |
| 7 | | | | | | | | | | | | |

TABLE

SETTINGS

SETTINGS FOR WHOLE TABLE:
· DISPLAY ZERO VALUES: ON

SETTINGS FOR EACH CELL:
· F4:6: DISPLAY HATCHING FOR VALUES LESS THAN 0

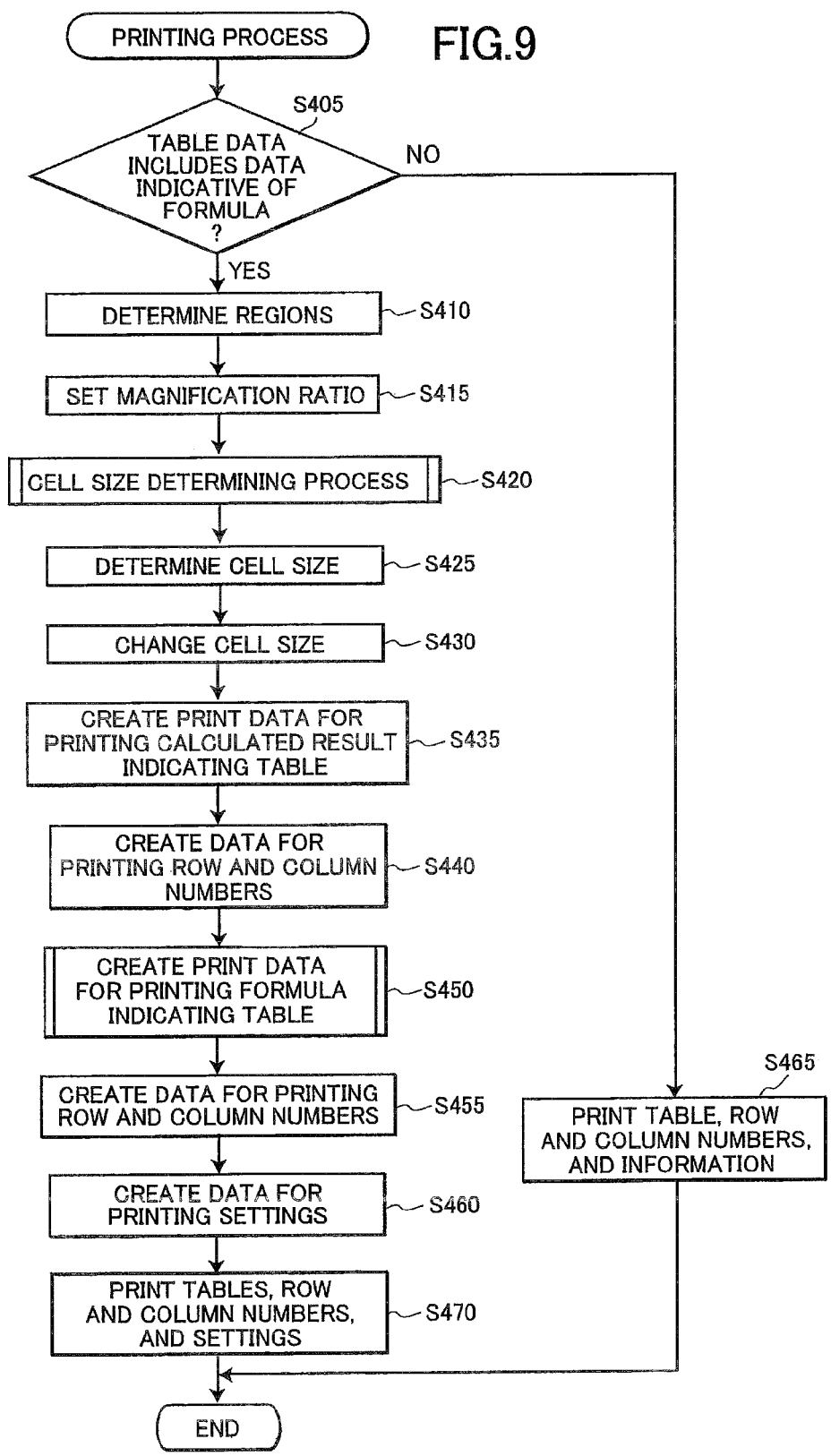

FIG.10A

| | A | B | C | D | E | F | G | H | I | J | K | L |
|---|---|---|---|---|---|---|---|---|---|---|---|---|
| 1 | | | | | | | | | | | | |
| 2 | | PART NUMBER | NUMBER OF | | | | | | | | | |
| 3 | | | | | PRODUCT NAME | NUMBER OF PIECES | UNIT PRICE | SUM | 1 | PART1 | | 100 |
| 4 | | 3 | | 1 | =PART3 | 1 | | 300 | 2 | PART2 | | 200 |
| 5 | | 2 | | 2 | =PART2 | 2 | | 200 | 3 | PART3 | | 300 |
| 6 | | | | | | | | 400 | 4 | PART4 | | 150 |
| 7 | | | | | | | TOTAL | 700 | | | | |

| | A | B | C | D | E | F | G | H | I | J | K | L |
|---|---|---|---|---|---|---|---|---|---|---|---|---|
| 1 | | | | | | | | | | | | |
| 2 | | PART NUMBER | NUMBER OF | | | | | | | | | |
| 3 | | | | | PRODUCT NAME | NUMBER OF PIECES | UNIT PRICE | SUM | 1 | PART1 | | 100 |
| 4 | | 3 | | 1 | =LOOKUP(B4, J3:J6, K3:K6) | =C4 | =LOOKUP(B4, J3:J6, L3:L6) | =F4*G4 | 2 | PART2 | | 200 |
| 5 | | 2 | | 2 | =LOOKUP(B5, J3:J6, K3:K6) | =C5 | =LOOKUP(B5, J3:J6, L3:L6) | =F5*G5 | 3 | PART3 | | 300 |
| 6 | | | | | | | | | 4 | PART4 | | 150 |
| 7 | | | | | | | TOTAL | =SUM(H4:H6) | | | | |

SETTINGS FOR WHOLE TABLE:
- DISPLAY ZERO VALUES: ON

SETTINGS FOR EACH CELL:
- F4:6: DISPLAY HATCHING FOR VALUES LESS THAN 0

FIG.10B

| | A | B | C | D | E | F |
|---|---|---|---|---|---|---|
| 1 | | | | | | |
| 2 | | | | | EQUIPMENT CONTROL | |
| 3 | | | | | ITEM | NUMBER OF PIECES |
| 4 | | | | | TABLE | 2 |
| 5 | | | | | CHAIR | 1 |
| 6 | | | | | | |
| 7 | | | | TABLE HAS NO CELL ASSOCIATED WITH FORMULAS | | |

TABLE DATA PROCESSING APPARATUS FOR CREATING TABLE DATA CONTAINING COMPLETE FORMULAS

CROSS REFERENCE TO RELATED APPLICATION

This application claims priority from Japanese Patent Application No. 2009-185511 filed Aug. 10, 2009. The entire content of the priority application is incorporated herein by reference.

TECHNICAL FIELD

The present invention relates to a printer for printing a table having a plurality of cells that are arranged in a plurality of rows and in a plurality of columns.

BACKGROUND

Spreadsheet software for creating a table having a plurality of cells that are arranged in a plurality of rows and in a plurality of columns is well known. The table includes a character, a numerical value, or the like inputted in each of the corresponding cells. If a formula is inputted in any one of the plurality of cells, the spreadsheet software calculates a value based on the expression in the formula and displays the result in the corresponding cell. Further, Microsoft's (registered trademark) spreadsheet program Excel (registered trademark), for example, has a feature called "Formula Auditing" that enables the user to display the formula, rather than the calculated result, in all cells with inputted formulas throughout the entire table.

SUMMARY

However, in the conventional spreadsheet software, when the formula is displayed in the corresponding cell in place of the calculated result obtained based on the formula, the size of the corresponding cell is adjusted without any regard for the size required to display the entire formula, and the formula is displayed in the cell having this adjusted size. Hence, if the adjusted size of the cell is shorter than the formula, the entire formula cannot be displayed in the corresponding cell. Accordingly, when printing the table created in the spreadsheet software with formulas in place of the calculated results, some parts of the formulas may be impossible to display in the corresponding cells. Therefore, the user cannot view the entire formula in some cells.

FIG. 1A illustrates a table created on a worksheet using the spreadsheet software. In the table shown in FIG. 1A, the total price of all parts is calculated based on inputted cells and a look-up table. When displaying the formula in place of the calculated result according to the table shown in FIG. 1A, the size of the cell in which the formula is inputted is adjusted, and the formula is display in the cell having the adjusted size, as shown in FIG. 1B. If the table displaying formulas in cells having the adjusted size shown in FIG. 1B is printed, a portion of each formula must be omitted from the corresponding cell because the entire formula cannot fit therein. Hence, while the user can confirm that formulas have been inputted in the adjusted cells located in the columns under "Product name" and "Unit price," the user cannot view the entire formula.

In view of the foregoing, it is an object of the present invention to provide a printer capable of printing formulas in their entirety within corresponding cells when printing a table created on a worksheet using spreadsheet software.

In order to attain the above and other objects, there is provided a printer including an input unit, a cell-size changing unit, a print data creating unit, and a printing unit. The input unit receives table data describing a table including a plurality of cells. Each of the plurality of cells has a size. The cell-size changing unit is configured to be capable of changing the size of a cell that is associated with a formula. The print data creating unit creates print data for printing a cell-size changed table that includes the size changed cell in a predetermined part of a recording sheet such that the formula fits entirely within the size changed cell, if the cell-size changing unit changes the size of the cell. The printing unit prints the cell-size changed table based on the print data in the predetermined part of the recording sheet.

According to another aspect of the present invention, there is provided a non-transitory computer readable storage medium storing a set of program instructions installed on and executed by a computer for creating print data. The program instructions includes: receiving table data describing a table including a plurality of cells, each of the plurality of cells having a size; changing the size of a cell that is associated with a formula; creating print data for printing a cell-size changed table that includes the size changed cell in a predetermined part of a recording sheet such that the formula fits entirely within the size changed cell; and transmitting the created print data to a printer.

According to another aspect of the present invention, there is provided a printer including an input unit, a cell-size changing unit, and a print data creating unit. The input unit receives table data describing a table including a plurality of cells. Each of the plurality of cells has a size. The cell-size changing unit is configured to be capable of changing the size of a cell that is associated with a formula. The print data creating unit creates print data for printing a cell-size changed table that includes the size changed cell in a predetermined part of a recording sheet such that the formula fits entirely within the size changed cell, if the cell-size changing unit changes the size of the cell.

BRIEF DESCRIPTION OF THE DRAWINGS

In the drawings:

FIGS. 1A and 1B are explanatory diagrams showing tables created using conventional spreadsheet software;

FIG. 5 is a diagram illustrating a printing result of a table, row and column numbers, and settings according to the first embodiment of the present invention;

FIG. 9 is a flowchart illustrating steps of a printing process according to a second embodiment of the present invention; and FIGS. 10A and 10B are diagrams illustrating a printing result based on table data according to the second embodiment of the present invention.

DETAILED DESCRIPTION

Next, a printer according to an embodiment of the present invention will be described while referring to the accompanying drawings. The printer directly prints tables based on data directly read from a USB memory or a memory card. The data stored in the USB memory or the memory card has been created with spreadsheet software.

First Embodiment

1. Configuration of the Printer

Figure 2:
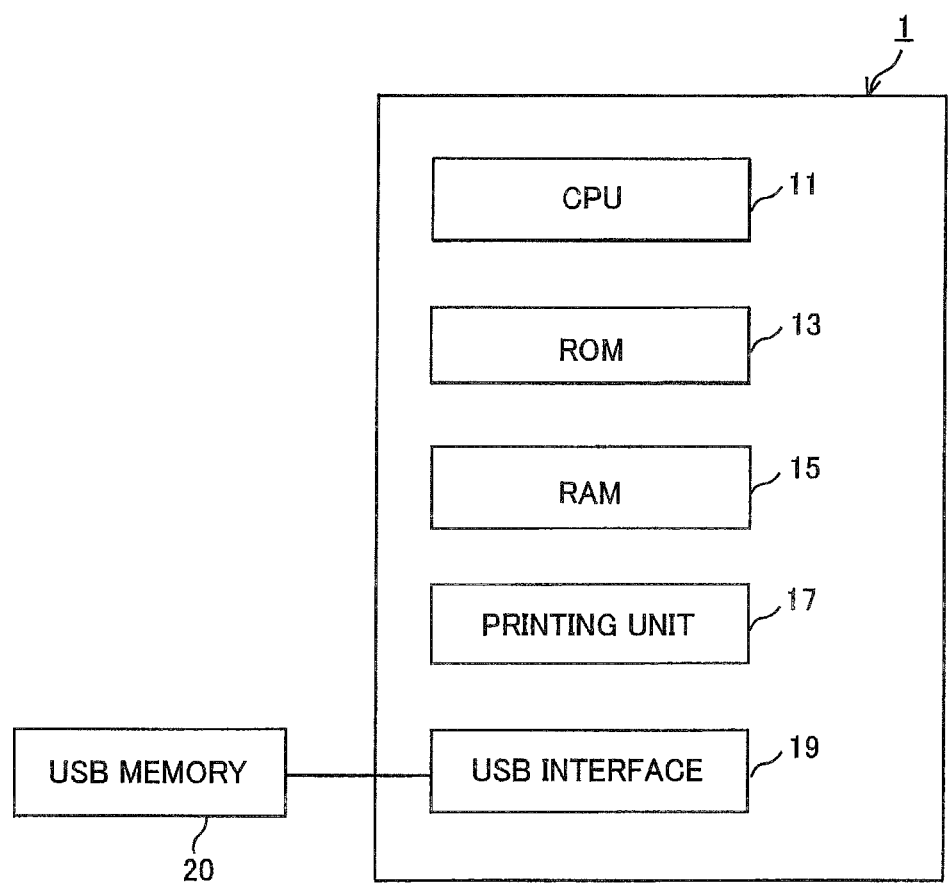
FIG. 2 is a block diagram showing a configuration of a printer according to a first embodiment of the present invention.

A configuration of the a printer 1 according to a first embodiment of the present invention will be described with reference to FIG. 2. FIG. 2 is a block diagram showing the configuration of the printer 1 according to the first embodiment of the present invention. The printer 1 includes a CPU 11, a ROM 13, a RAM 15, a printing unit 17, and a USB interface 19.

Figure 4:
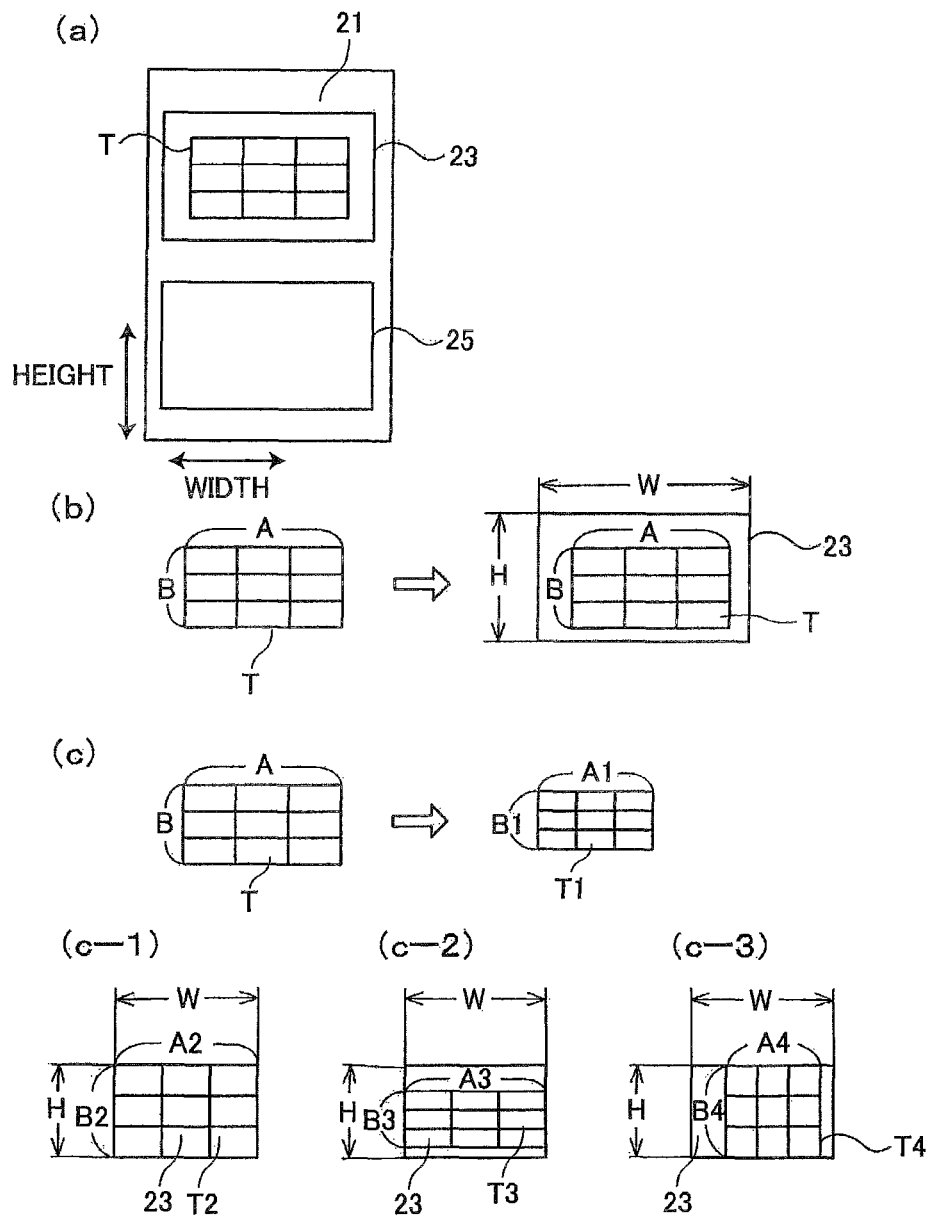
FIG. 4 is a diagram illustrating a relationship between a table printing region and table to be printed in the table printing region according to the first embodiment.

The CPU 11 performs overall control of each component in the printer 1. The ROM 13 stores various programs executed by the CPU 11. The printer 1 performs various operations, such as a printing process of the first embodiment, based on the programs. The RAM 15 is used as a storage area for storing various data produced when the CPU 11 executes various operations. Further, the RAM 15 is also used as a storage area when the CPU 11 executes various operations. The printing unit 17 is provided with a mechanism for printing a table based on table data of a worksheet on a recording sheet. A USB memory 20 is detachably mounted on the USB interface 19. The printer 1 reads the table data stored in the USB memory 20 and created using the spreadsheet software, and executes the printing process. The table data includes data describing a table, row and column numbers, and settings. The table includes a plurality of cells and a plurality of contents that are each associated with any one of the plurality of cells. The plurality of cells are arranged in a plurality of rows and in a plurality of columns. The rows are arranged in a lengthwise direction of a recording sheet 21 and the columns are arranged in a widthwise direction of the recording sheet 21, as shown in FIG. 4A. Each of the contents indicates one of a formula, a value calculated using the formula (hereinafter "calculated result"), and a character. In the table, a formula and a calculated result obtained based on the formula are associated with one cell.

When the table data created on the worksheet using the spreadsheet software is printed on the recording sheet as a table, a user of the printer 1 can set a printing format in advance. The printing format indicates whether to print formulas or calculated results obtained based on the formulas in cells associated with the formulas. The printing format is stored in the RAM 15.

2. Printing Process

Figure 3:
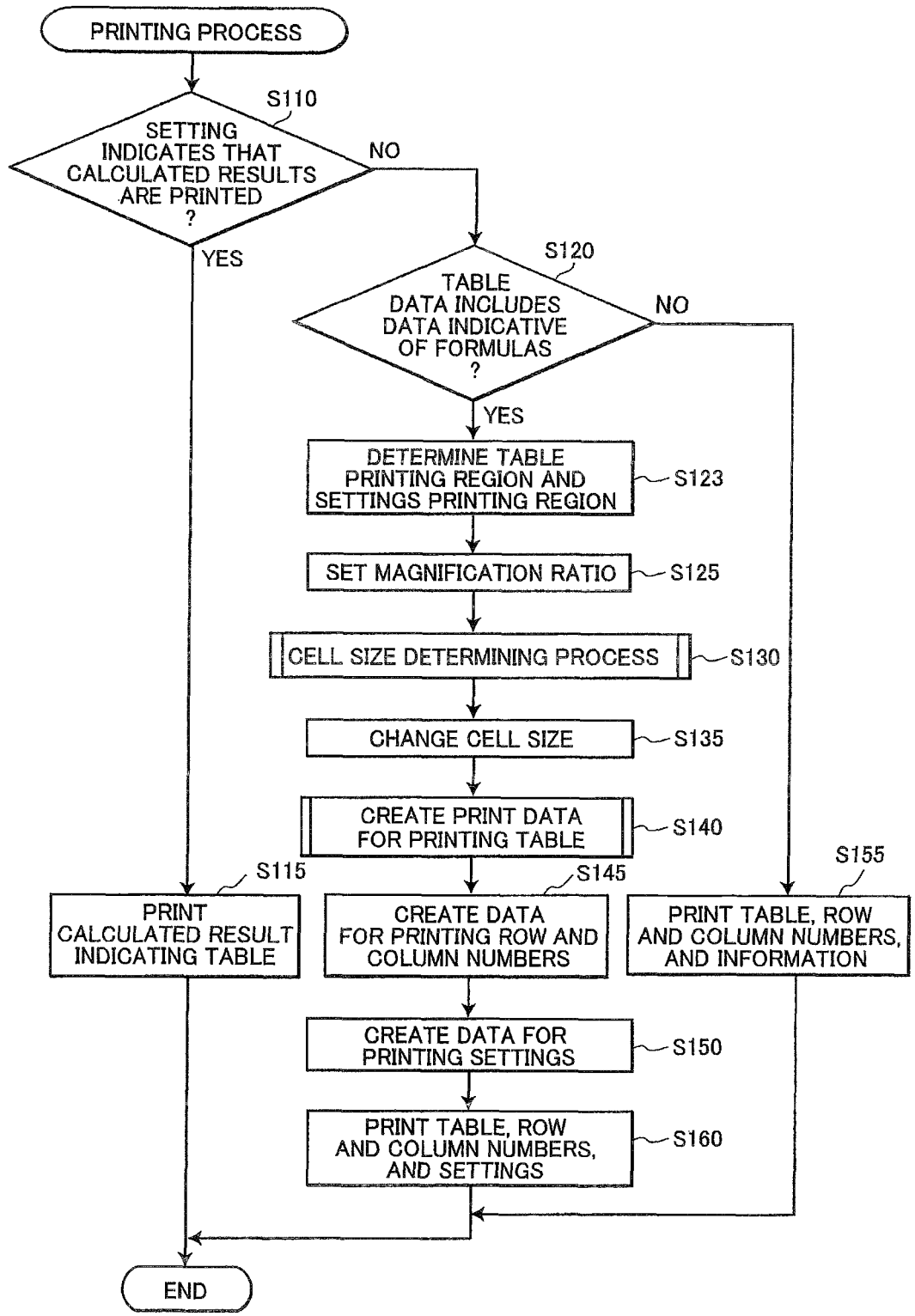
FIG. 3 is a flowchart illustrating steps in a printing process according to the first embodiment of the present invention.

Next, a printing process for printing the table data created on the worksheet using the spreadsheet software will be described with reference to FIG. 3. FIG. 3 is a flowchart illustrating steps in the printing process.

The printing process is started when a user issues a print instruction for data stored in the USB memory 20. The table data created on a worksheet using the spreadsheet software is stored in the USB memory 20.

At the beginning of the printing process, in S110 the CPU 11 reads the printing format stored in the RAM 15 and judges whether or not the setting of the printing format indicates that calculated results obtained based on formulas are to be printed in cells associated with these formulas. If the CPU 11 determines that the setting of the printing format indicates that the calculated results obtained based on the formulas are to be printed in the cells (S110: YES), in S115 a calculated result indicating table is printed such that the calculated results are printed in cells associated with formulas. Since the printing operation in S115 for printing the calculated result indicating table is a commonly-known technique, details of the printing operation are omitted. After printing the calculated result indicating table, the CPU 11 ends the printing process.

On the other hand, if the CPU 11 determines that the setting of the printing format does not indicate that the calculated results are to be printed in the cells (i.e. the setting of the printing format indicates that, instead of the calculated results, the formulas are to be printed in the cells; S110: NO), in S120 the CPU 11 judges whether or not the table data includes data indicative of formulas. Since the printer 1 stores a standard for judging whether the content represents a formula or a character, the CPU 11 can determine, based on the standard, whether or not the table data includes data indicative of formulas. For example, if the standard denotes a character string beginning with the character "=", the CPU 11 determines that content matching this standard represents a formula.

If the CPU 11 determines that the table data includes data indicative of formulas (S120: YES), in S123 the CPU 11 determines a table printing region 23 and a settings printing region 25 on the recording sheet 21, as shown in FIG. 4A. A table T corresponding to data describing a table in the table data is positioned in the table printing region 23 of the recording sheet 21. Settings provided for the whole table and each of the plurality of cells in the table are positioned in the setting printing region 25 of the recording sheet 21. As shown in FIG. 5, the settings provided for the whole table and each of the plurality of cells indicates that a "display zero values" setting is ON and that a "display hatching for values less than 0" setting is applied to cells F4-F6. The table printing region 23 and the settings printing region 25 may be preset in the printer 1 or may be set by a user during every printing process.

After the table printing region 23 and the settings printing region 25 are determined, in S125 the CPU 11 sets a printable magnification ratio for the entire table. The magnification ratio is set such that the entire table can fit within the table printing region 23 when reduced by the magnification ratio. The process in S125 will be described with reference to FIGS. 4A to 4C.

When the table corresponding to the table data created on the worksheet is printed on the recording sheet 21 at an original size indicated by the table data, the table T corresponding to the table data has a width A and a height B as shown in FIG. 4B. The table printing region 23 has a width W and a height H. Then, if the entire table T fits within the table printing region 23 at the original size, the CPU 11 determines that the entire table T corresponding to the table data is printable in the table printing region 23 without undergoing a size change. That is, if the conditions "width A of table T≦width W of table printing region 23" and "height B of table T≦height H of table printing region 23" are satisfied, the CPU 11 sets the magnification ratio to 100%.

However, when the entire table T does not fit within the table printing region 23 at the original size, as shown in FIG. 4C, the CPU 11 calculates a magnification ratio for the table T such that at least one of a reduced width A1 and a reduced height B1 of the table T1 is equal to the width W and height H of the table printing region 23. Specifically, as shown in (C-1) of FIG. 4C, if the ratio of the width W of the table printing region 23 to the width A of the table T is equal to the ratio of the height H of the table printing region 23 to the height B of the table T, the CPU 11 calculates the magnification ratio from the expression "(width W of table printing region 23)/ (width A of table T)." A reduced width A2 and a reduced height B2 of a table T2 produced by multiplying the width A and height B of the table T are equal to the width W and the height H of the table printing region 23, respectively. Accordingly, since the reduced width A2 and the reduced height B2 are equal to the width W and the height H of the table printing region 23 respectively, the table T2 is printed in the table printing region 23 with no margin in the widthwise direction and the lengthwise direction of the recording sheet 21.

On the other hand, if the ratio of the width W of the table printing region 23 to the width A of the table T is smaller than the ratio of the height H of the table printing region 23 to the height B of the table T, the CPU 11 calculates the magnification ratio from the expression "(width W of table printing region 23)/(width A of table T)" (W/A). The resulting table T3 is printed in the table printing region 23 such that a reduced width A3 of the table T3 reduced by the magnification ratio (W/A) is equal to the width W of the table printing region 23 and a reduced height B3 of the table T3 reduced by the magnification rate (W/A) is shorter than the height H of the table printing region 23. Accordingly, since the reduced width A3 is equal to the width W of the table printing region 23, the table T3 is printed in the table printing region 23 with no margin in the widthwise direction of the recording sheet 21. However, since the reduced height B3 is shorter than the height H of the table printing region 23, the table T3 has some margin in the lengthwise direction of the recording sheet 21 when printed in the table printing region 23.

Further, if the ratio of the width W of the table printing region 23 to the width A of the table T is greater than the ratio of the height H of the table printing region to the height B of the table T, the CPU 11 calculates the magnification ratio from the expression "(height H of table printing region 23)/ (height B of table T)" (H/B). The resulting table T4 is printed in the table printing region 23 such that a reduced height A4 of the table T4 reduced by the magnification ratio (H/B) is equal to the height H of the table printing region 23 and a reduced width A4 of the table T4 reduced by the magnification ratio (H/B) is shorter than the width W of the table printing region 23. Accordingly, since the reduced width A4 is shorter than the width W of the table printing region 23, the table T4 is printed in the table printing region 23 with margin in the widthwise direction of the recording sheet 21. However, since the reduced height B4 is equal to the height H of the table printing region 23, the table T4 printed in the table printing region 23 has no margin in the lengthwise direction of the recording sheet 21.

After calculating the magnification ratio, the CPU 11 advances to a cell size determining process of S130. In the cell size determining process, the CPU 11 judges whether or not there is room in the table printing region 23 to increase the size of cells in the table when printing the table in the table printing region 23 at the size determined by the original size of the table and the magnification ratio calculated in S125. If the CPU 11 determines that there is room to increase the size of cells in the table printing region 23, the CPU 11 determines a new size for cells that must be enlarged. In other words, the CPU 11 increases the size of cells in the table, whose size is determined by the original size of the table and the magnification rate, to a size that is no greater than a maximum size beyond which the table can no longer fit within the table printing region 23. The details of the cell size determining process will be described later.

After determining the new size of the cells being enlarged in the cell size determining process, in S135 the CPU 11 changes the size of the cells to the new size calculated in S130. However, if the CPU 11 determines that there is no cell within which the entire formula cannot fit and that there is no room in the table printing region 23 to increase the widths and heights of cells in the table, in S135 the CPU 11 does not change the size of the cells.

After changing the size of the cells, the CPU 11 advances to a table data creating process in S140. The table data creating process will be described later in greater detail.

After the table data creating process, in S145 the CPU 11 creates data for printing the row and column numbers on the recording sheet 21. The row and column numbers indicate positions of the cells within the table. Generally, when the table is printed, data describing a plurality of cells and a plurality of contents is generated as print data for printing the table. That is, the print data for printing the table does not include data describing the row and column numbers. Hence, the CPU 11 reads data describing the row and column numbers from the table data, creates data for printing the row and column numbers such that each of the row and column numbers will be printed on the recording sheet 21 at positions corresponding to the sizes and positions of the plurality of cells determined in S125 and S130 and stores this data in the RAM 15. It should be noted that the row and column numbers are printed outside of the table printing region 23.

After creating data for printing the row and column numbers, in S150 the CPU 11 creates data for printing the settings established for the whole table and each of the plurality of cells in the setting printing region 25. The print data for printing the table does not include data describing settings set for the whole table and each of the plurality of cells as well as the data describing the row and column numbers. Hence, the CPU 11 reads data describing the settings established for the whole table and each of the plurality of cells, creates the data for printing the settings in the setting printing region 25, and stores this data in the RAM 15. After creating data for printing the settings, in S160 the CPU 11 prints the table, the row and column numbers, and the settings based on the print data for printing the table, the data for printing the row and column numbers, and the data for printing the settings, and ends the printing process.

FIG. 5 shows a printing result of the table, the row and column numbers, and the settings through the processes of S120 to S160. As shown in FIG. 5, since the formulas are displayed in their entirety within the corresponding cells, the user can confirm all of each formula.

Further, since the row and column numbers are printed on the recording sheet 21 in an area surrounded by a dashed line, the user can easily identify formulas based on the row and column numbers. Furthermore, since the settings established for the whole table and each of the plurality of cells in the table is printed in the setting printing region 25, the user can easily confirm the settings.

On the other hand, if the CPU 11 determines that the table data does not include cells associated with formulas (S120: NO), in S155 the CPU 11 creates information data representing information indicating that the table has no cell associated with a formula and prints, based on the table data received from the USB memory 20, a table including only characters, the row and column numbers, and the information indicating that the table has no cells associated with formulas, and ends the printing process. Hence, the user can easily confirm that the table has no cells associated with formulas.

3. Cell Size Determining Process

Figure 6:
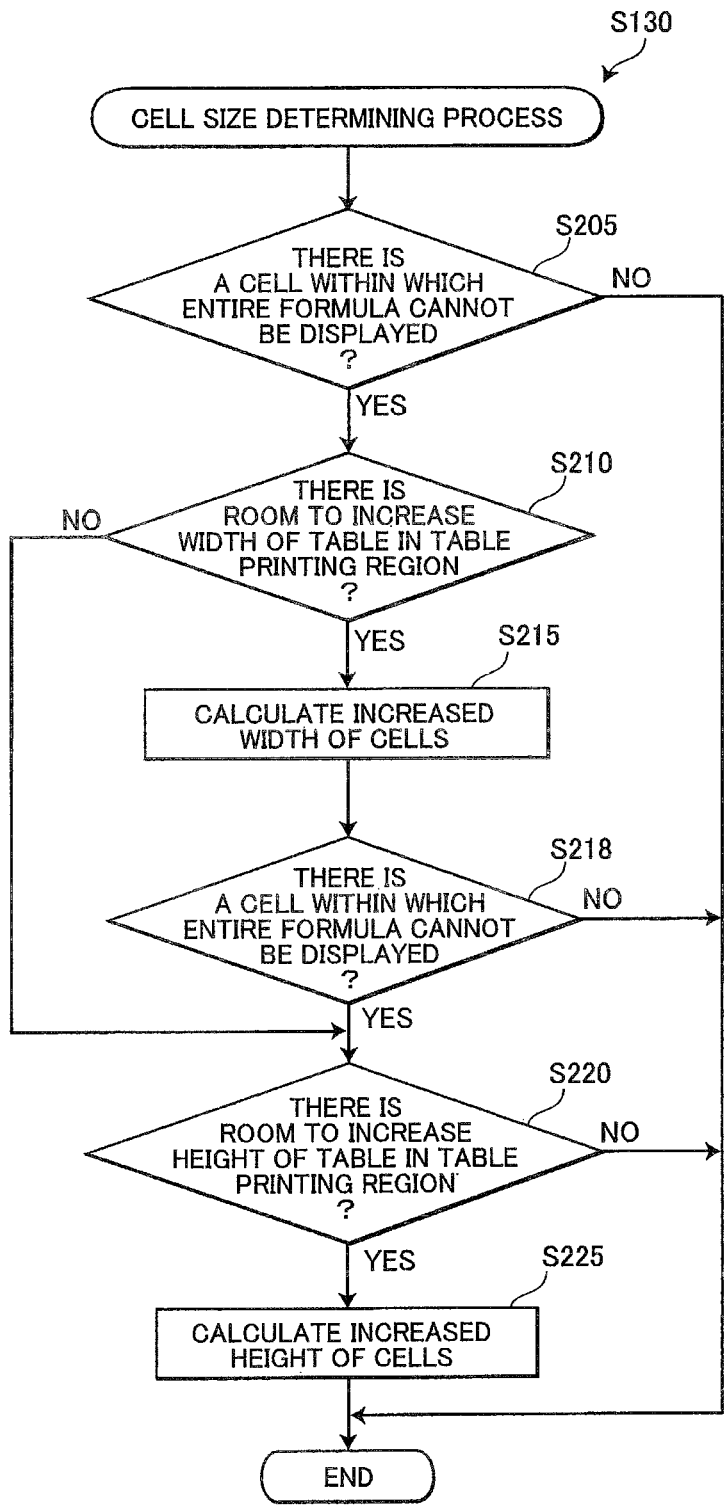
FIG. 6 is a flowchart illustrating steps in a cell size determining process according to the first embodiment of the present invention.

Next, the cell size determining process in S130 will be described with reference to FIG. 6. FIG. 6 is a flowchart illustrating steps in the cell size determining process.

At the beginning of the cell size determining process, in S205 the CPU 11 judges whether or not there is a cell within which the entire formula associated with the cell cannot be displayed. Specifically, the CPU 11 judges whether or not the entire formula formed of characters at the inputted size can fit within the cell whose size is determined based on the magnification ratio calculated in S125. When the CPU 11 determines that there is a cell within which the entire formula associated with the cell cannot be displayed (S205: YES), the CPU 11 advances to S210. On the other hand, when the CPU 11 determines that there is no cell within which the entire formula cannot fit (S205: NO), the CPU 11 ends the cell size determining process. In S210 the CPU 11 judges whether or not there is room to increase the width of the table in the table printing region 23 when printing the table, whose size is determined by the original size of the table and the magnification rate calculated in S125, on the table printing region 23. Specifically, the CPU 11 judges whether or not there will be any margin in the widthwise direction of the table printing region 23 when the table is printed in the table printing region 23 at the magnification ratio.

For example, as shown in (C-1) and (C-2) of FIG. 4C, if the reduced widths A2 and A3 are equal to the width W of the table printing region 23, there is no margin in the table printing region 23 on either side of the tables T2 and T3 in the widthwise direction of the recording sheet 21. Hence, the CPU 11 determines that there is no room in the table printing region 23 to increase the widths of cells in either of the tables T2 and T3 (S210: NO), and advances to S220.

On the other hand, as shown in (C-3) of FIG. 4C, if the reduced width A4 is shorter than the width W of the table printing region 23, there is some margin in the table printing region 23 on either side of the table T4 in the widthwise direction of the recording sheet 21. Hence, the CPU 11 determines that there is room in the table printing region 23 to increase the widths of cells in the table T4 (S210: YES).

When the CPU 11 determines that there is room in the table printing region 23 to increase the widths of cells in the table (S210: YES), in S215 the CPU 11 calculates an increased width for the cells that must be widened. Here, a "cell that must be widened" denotes a cell holding a formula that does not fit entirely within the cell when the table is printed in the table printing region 23 at the magnification ratio calculated in S125. On the other hand, if the CPU 11 determines that there is cell within which the entire formula cannot fit (S205: YES) and there is no room in the table printing region 23 to increase the widths of cells in the table (S210: NO), the CPU 11 advances to S220 to determine whether or not there is room in the table printing region 23 to increase the height of the table.

In S215, the CPU 11 calculates the increased width that must be applied to all cells of each column that includes a cell associated with a formula in order that the entire formula can fit within the corresponding cell. Further, the CPU 11 calculates the expression (total of increased widths for all columns/ width W of the table printing region 23) (hereinafter referred to as a width extensible magnification ratio). When the width extensible magnification ratio is less than or equal to "1," the CPU 11 determines that the table can be printed in the table printing region 23 after increasing the widths of cells in each column. Hence, the CPU 11 calculates the increased width as the new width of the cells for each column.

Figure 7A:
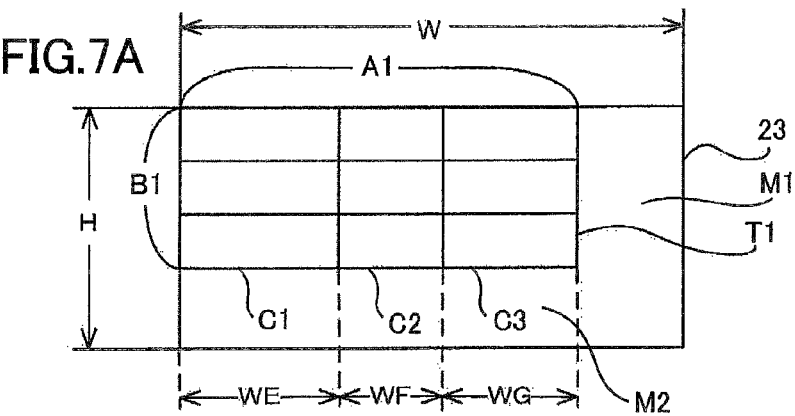
FIGS. 7A-7C are explanatory diagrams showing a process performed in S215 of the cell size determining process in FIG. 6.
Figure 7B:
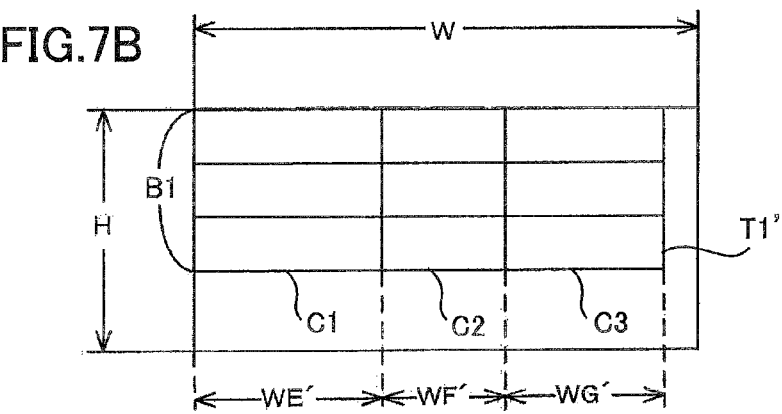

As shown in FIG. 7A, the table T1 of FIG. 4C is located within the table printing region 23 and includes a first column C1 having a first width WE, a second column C2 having a second width WF, and a third column C3 having a third width WG. Then, in order that each formula inputted in a cell can fit entirely in the corresponding cell, as shown in FIG. 7B, the width of the first column C1 is increased from the first width WE to the first width WE', the width of the second column C2 is increased from the second width WF to the second width WF', and the width of the third column C3 is increased from the third width WG to the third width WG'. When the total of the first width WE', the second width WF' and the third width WG' is less than or equal to the width W of the table printing region 23, the width extensible magnification ratio is less than or equal to "1." In other words, the CPU 11 increases the total width of all columns by an amount that is no greater than a margin M1. Hence, each column of the table T1' can be printed with a required width.

Figure 7C:
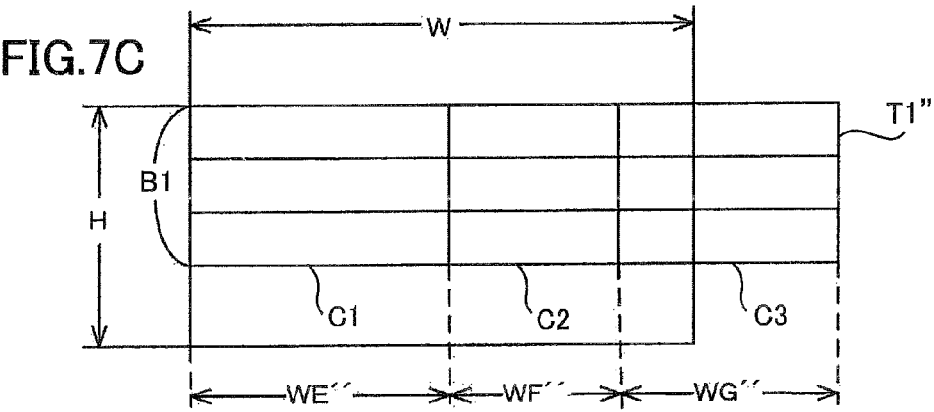

On the other hand, when the width extensible magnification ratio is larger than "1," the margin M1 in the table printing region 23 is shorter than a required width for increasing the widths of the columns. In this case, the margin M1 is distributed to each column that needs to be widened. As shown in FIG. 7A, the table T1 of FIG. 4C is located within the table printing region 23 and includes the first column C1 having the first width WE, the second column C2 having the second width WF, and the third column C3 having the third width WG. Then, in order that each formula inputted in a cell can fit entirely within the corresponding cell, as shown in FIG. 7C, the width of the first column C1 is increased from the first width WE to the first width WE", the width of the second column C2 is increased from the second width WF to the second width WF", and the width of the third column C3 is increased from the third width WG to the third width WG". When the total of the first width WE", the second width WF" and the third width WG" is greater than the width W of the table printing region 23, the width extensible magnification ratio is greater than "1." Hence, the required increase in width for each column cannot be ensured with the margin M1 of the table printing region 23. Accordingly, the margin M1 is distributed to each column that must be widened. Specifically, the CPU 11 calculates the amount of increase in width required for each column and distributes the margin M1 to each column requiring an increase in width depending on the amount of the required increase.

In this way, the width of each column can be increased by using the margin M1 that is generated when the table, whose size is determined by the original size of the table and the magnification ratio calculated in S125, is formed in the table printing region 23. Hence, the table with the increased width can be printed on a sheet of paper. After calculating the increased width of each column that needs to be widened, the CPU 11 advances to S218.

In S218 the CPU 11 judges whether or not there is a cell within which the entire formula associated with the cell cannot be displayed. Specifically, when the CPU 11 determines that there is room to increase the width of the table in the table printing region 23 (S210: YES), in S218 the CPU 11 judges whether or not the entire formula formed of characters at the inputted size can fit within the cell having the increased width calculated in S215. If the entire formula cannot fit within the cell having the increased width, the CPU 11 determines that there is a cell within which the entire formula associated with the cell cannot be displayed (S218: YES) and advances to S220.

When the entire formula can fit within the corresponding cell, the CPU 11 determines that there is no cell within which the entire formula cannot fit (S218: NO) and ends the cell size determining process.

In S220 the CPU 11 judges whether or not there is room in the table printing region 23 to increase the height of the table. Specifically, the CPU 11 judges whether or not there will be any margin above or below the table in the lengthwise direction of the table printing region 23 when the table is printed in the table printing region 23 at the magnification ratio calculated in S125.

For example, as shown in (C1)- and (C-3) of FIG. 4C, if the reduced heights B2 and B4 are equal to the height H of the table printing region 23, the table printing region 23 has no margin above or below the tables T2 and T4 in the lengthwise direction of the recording sheet 21. Hence, the CPU 11 determines that there is no room in the table printing region 23 to increase the heights of cells in either of the tables T2 and T4 (S220: NO), and ends the cell size determining process.

On the other hand, as shown in (C-2) of FIG. 4C, if the reduced height B3 is shorter than the height H of the table printing region 23, there is some margin in the table printing region 23 above or below the table T3 in the lengthwise direction of the recording paper 21. Hence, the CPU 11 determines that there is room in the table printing region 23 to increase the heights of cells in the table T3 (S220: YES).

When the CPU 11 determines that there is room in the table printing region 23 to increase the heights of cells in the table (S220: YES), in S225 the CPU 11 calculates an increased height for the cells that must be expanded. Here, a "cell that must be expanded" denotes a cell holding a formula that does not fit entirely within the cell when the table is printed in the table printing region 23 at the magnification ratio calculated in S125. When the height is increased for cells that must be expanded, the formula is divided into more than one line and is printed in the corresponding cell having the increased height.

The method of calculating the increased height of the cell in S225 is performed in the same manner as the process in S215, while replacing the column with the row and the width with the height. That is, using the table after the width of its cells were increased in S215, the CPU 11 calculates an increased height for the cells of each row in which a formula is present in order to fit the entire formula within the corresponding cell. Further, the CPU 11 calculates the expression (total of increased heights for all rows/height H of the table printing region 23) (hereinafter referred to as a height extensible magnification ratio). When the height extensible magnification ratio is less than or equal to "1," the CPU 11 determines that the table can be printed in the table printing region 23 after increasing the heights of cells in each row. Hence, the CPU 11 calculates the increased height as the new height of the cells for each row. On the other hand, when the height extensible magnification ratio is greater than "1," since the margin M2 in the table printing region 23 is shorter than a required height for increasing the heights of the rows, the margin M2 in FIG. 7A is distributed to each row that needs to be expanded in height depending on the amount of the required increase. After the CPU 11 determines the increased height of the cells in S215 and determines that there is no cell within which the entire formula cannot fit (S218: NO), the CPU 11 ends the cell size determining process, and stores the cell size of each cell determined in the cell size determining process in the RAM 15.

Since the height of each row to be expanded is increased by effectively using the margin formed in the table printing region, the table can be printed on one recording sheet 21 after increasing the height of cells in these rows.

Therefore, by increasing the height of rows with cells that store formulas, the increased height allows the formulas to be divided into more than one line and printed in the corresponding cells.

Further, in the cell size determining process, the CPU 11 determines the increased heights of the cells in S225 after determining the increased widths of the cells in S215. Hence, if the formula is inputted in a cell as a horizontal string and the size of the same cell is increased to a size within which the formula fits in its entirety, there is no need to divide the formula into more than one line. Accordingly, the formula can be displayed in an easy-to-read single line.

4. Table Data Creating Process

Figure 8:
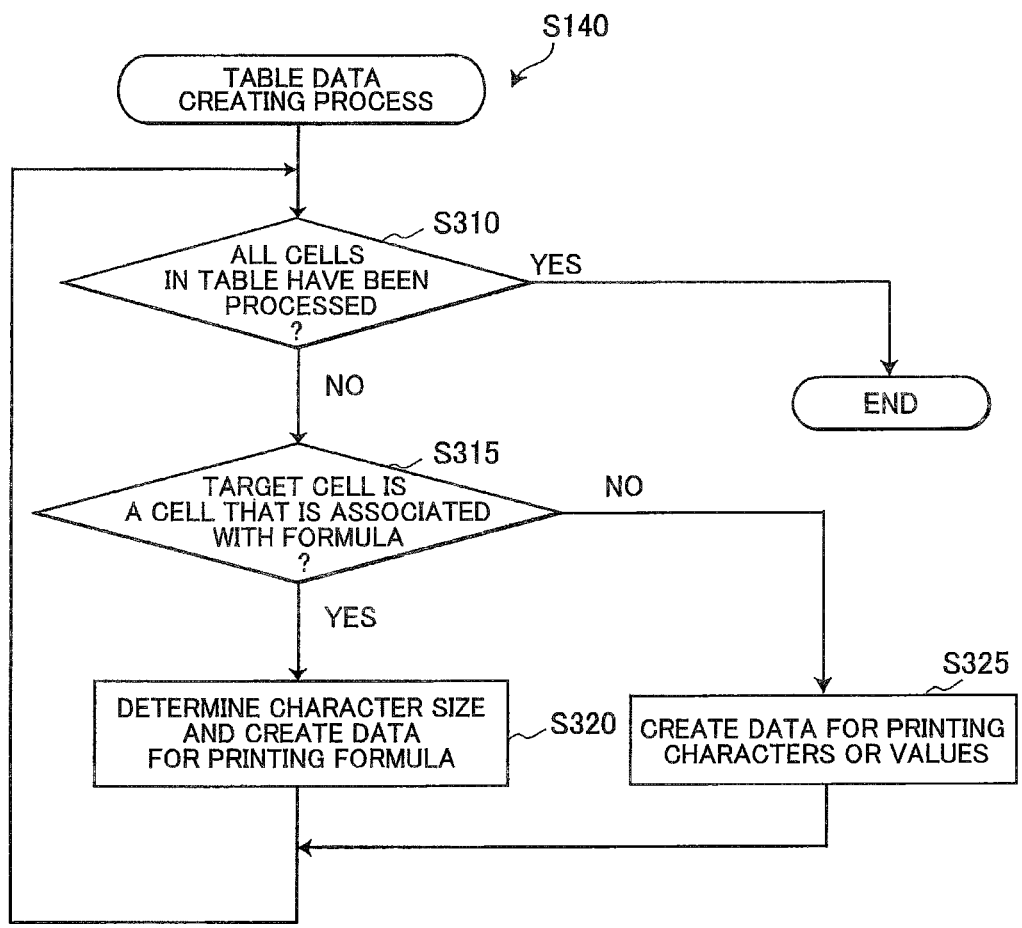
FIG. 8 is a flowchart illustrating steps of a table data creating process according to the first embodiment of the present invention.

Next, the table data creating process will be described with reference to FIG. 8. FIG. 8 is a flowchart illustrating steps of the table data creating process.

In the table data creating process, the CPU 11 creates the print data for printing a table cell-by-cell. At the beginning of the table data creating process, in S310 the CPU 11 judges whether all of the cells in the table have been processed. Since none of the cells in the table have been processed the first time the CPU 11 arrives at S310 (S310: NO), the CPU 11 advances to S315. In S315 the CPU 11 judges whether or not a target cell is a cell that is associated with a formula.

If the CPU 11 determines that the target cell is a cell that is associated with a formula (S315: YES), in S320 the CPU 11 determines a character size of characters constituting the formula such that the entire formula can fit within the target cell, creates data for printing the formula having the determined character size, and stores the data in the RAM 15. Specifically, the CPU 11 determines a character size of the characters constituting the formula such that the entire formula can fit within the target cell having the cell size determined in the cell size determining process. If the width and the height of the target cell were increased in S135, S215, and S225, the CPU 11 divides the formula having the determined character size into more than one line and creates data for printing the divided formula. Further, if the CPU 11 determines that the width and the height of the target cell were not increased (S210: NO, S220: NO) and the entire formula does not fit within the target cell, the character size of the characters constituting the formula is reduced such that the entire formula can fit within the target cell without being divided into more than one line. Then, the CPU 11 creates data for printing the formula having the reduced character size and stores the data in the RAM 15. Accordingly, since the character size of the characters constituting the formula is adjusted such that the entire formula can fit within the target cell, the user can view the entire printed formula in the target cell.

On the other hand, if the CPU 11 determines that the target cell is not a cell associated with a formula (S315: NO), in S325 the CPU 11 creates data for printing characters or values associated with the target cell. It should be noted that, if the target cell is a blank cell, the CPU 11 does not create any data for printing. After the first target cell is processed in S320 or S325, the CPU 11 returns to S310 and processes a second target cell in S310, and S320 or S325. The CPU 11 repeats S310 to S325 for all of the target cells in the table until determining that all cells in the table have been processed (S310: YES), and ends the table data creating process. In this way, the CPU 11 creates print data for printing a table that includes a plurality of cells, each having the cell size determined in the cell size determining process, the formulas having the determined character size, and the characters or values.

Second Embodiment

Next, a second embodiment of the present invention will be described with reference to FIG. 9. FIG. 9 is a flowchart illustrating steps of the printing process according to the second embodiment of the present invention.

In the second embodiment, a formula indicating table and a calculated result indicating table are printed on a recording sheet. The formula indicating table has cells within which formulas associated with the corresponding cells have been inputted. The calculated result indicating table has cells corresponding to the cells associated with the formulas and within which calculated results obtained based on the corresponding formulas have been inputted. The second embodiment has a printing process. Since part of the printing process of the second embodiment is different from that of the first embodiment, the part of the printing process of the second embodiment differing from that of the first embodiment will be described in detail.

At the beginning of the printing process of the second embodiment, in S405 the CPU 11 judges whether or not the table data includes data indicative of formulas. If the CPU 11 determines that the table data includes data indicative of formulas (S405: YES), in S410 the CPU 11 determines a first region, a second region, and a settings printing region on a recording sheet. The formula indicating table is printed in the first region. The calculated result indicating table is printed in the second region. The settings established for the whole table and each of the plurality of cells is printed in the settings printing region. After determining the first region, the second region, and the settings printing region, in S415 the CPU 11 sets a printable magnification ratio for the entire table so that the entire table can fit within the first region. After setting the magnification rate, the CPU 11 advances to the cell size determining process in S420. The process of S405 in the second embodiment corresponds to the process of S120 in the first embodiment, the process of S410 to the process of S123, the process of S415 to the process of S125, and the process of S420 to the process of S130.

After completing the cell size determining process, in S425 the CPU 11 determines a cell size of cells holding the calculated results in the calculated result indicating table. The cell size determined in S425 may be set to any size that allows the entire calculated result indicating table to fit within the second region. For example, the cell size determined in S425 may be set to the same size as the cell size determined in S420 for the corresponding cell in the formula indicating table. In this case, each cell in the calculated result indicating table may have the same size as the corresponding cell in the formula indicating table. Thus, the user can easily compare the formulas in the formula indicating table with the calculated results obtained based on these formulas in the calculated result indicating table.

After completing the process of S425, in S430 the CPU 11 changes the size of each cell to the sizes determined in S420 and S425. That is, the size of cells in the formula indicating table that must be increased is changed to the size determined in S420, and the size of cells within which the calculated results are inputted is changed to the size determined in S425. However, if the CPU 11 determines that there is no cell within which the entire formula cannot fit (S205: NO) and that there is no room in the table printing region 23 to increase the widths and heights of cells in the table (S210 and S220: NO), in S430 the CPU 11 does not change the size of the cells in the formula indicating table. Further, if the cell size of the cells holding the calculated results is set to an original size indicated by the table data, in S430 the CPU 11 does not change the size of the cells in the calculated result indicating table. After changing the size of the cells, in S435 the CPU 11 creates print data for printing the calculated result indicating table in the second region and stores the print data in the RAM 15. In S440 the CPU 11 creates data for printing row and column numbers such that each of the row and column numbers are printed on the recording sheet at positions corresponding to the sizes and positions of the cells in the calculated result indicating table and stores the data in the RAM 15.

Next, in S450 the CPU 11 creates print data for printing the formula indicating table in the first region and stores the print data in the RAM 15. In S455 the CPU 11 creates data for printing row and column numbers such that each of the row and column numbers are printed on the recording sheet at positions corresponding to the sizes and positions of the cells in the formula indicating table and stores the data in the RAM 15. Further, in S460 the CPU 11 creates data for printing the settings established for the whole table and each of the plurality of cell in the settings printing region and stores the data in the RAM 15. In S470 the CPU 11 prints the calculated result indicating table and the formula indicating table based on the print data for printing the formula indicating table and the print data for printing the calculated result indicating table. Further, the CPU 11 prints the row and column numbers for the calculated result indicating table and the formula indicating table and the settings based on the data for printing the row and column numbers for the calculated result indicating table and the formula indicating table and the data for printing the settings, and ends the printing process. The processes of S450, S455, S460, and S470 in the second embodiment correspond to the processes of S140, S145, S150, and S160 respectively.

On the other hand, if the CPU 11 determines that the table data does not include cells that are associated with formulas (S405: NO), in S465 the CPU 11 prints, based on the table data received from the USB memory 20, a table including only characters, the row and column numbers, and the information indicating that the table has no cells associated with formulas and ends the printing process. Specifically, the information indicates that the table does not include a formula. The process of S465 in the second embodiment corresponds to the process of S155.

FIGS. 10A and 10B illustrate printed results of the table data according to the printing process of the second embodiment. FIG. 10A illustrates a printing result when printing tables based on table data including data indicative of formulas. FIG. 10B illustrates a printing result when printing a table based on table data not including data indicative of formulas.

As shown in FIG. 10A, the calculated result indicating table, the formula indicating table, and the settings set for the whole table and each of the cells are printed on one recording sheet. Hence, the user can easily compare the formulas in the formula indicating table with the calculated results obtained based on these formulas in the calculated result indicating table. Further, since the row and column numbers are printed on the recording sheet, the user can easily identify the formulas based on the row and column numbers. Furthermore, since the settings established for the whole table and each of the plurality of cells in the table are printed on the recording sheet, the user can easily confirm these settings. As shown in FIG. 10B, since information indicating that the table has no cells associated with formulas is printed on the recording sheet, the user can easily confirm that the table has no cells associated with formulas.

While the invention has been described in detail with reference to specific embodiments thereof, it would be apparent to those skilled in the art that many modifications and variations may be made therein without departing from the spirit of the invention, the scope of which is defined by the attached claims.

In the above embodiments, the CPU 11 sets a magnification ratio by which the entire table can be made to fit within the table printing region 23, and increases the size of cells in the table, whose size is determined based on the magnification ratio, to a size that is no greater than a maximum size beyond which the table can no longer fit within the table printing region of the recording sheet. However, the size of the cells may be increased based on the magnification ratio, without reducing the size of the table, such that an entire formula formed of characters at the original inputted size can fit within the increased cell size. That is, the size of cells in the table may be increased without limit. In other words, the size of cells in the table may be increased to a size that is greater than the maximum size beyond which the table can no longer fit within the table printing region of the recording sheet. In this case, a table with the increased cell size is printed on a plurality of recording sheets.

In the above embodiments, the table data includes data indicative of table functions, but the table data may include data indicative of mathematical expressions.

In the above embodiments, the CPU 11 sets a magnification ratio by which the entire table can be made to fit within the table printing region 23. However, the CPU 11 may set a magnification ratio by which the entire table and a region for the row and column numbers can be made to fit within the table printing region 23. That is, the entire table and space for one row and one column are sized to fit within the table printing region 23 according to the magnification ratio.

In the cell size determining process of the above embodiments, the CPU 11 judges whether or not there is room in the table printing region 23 to increase the height of the table after determining that there is a cell holding a formula that does not entirely fit within the cell (S218: YES). However, the CPU 11 may determine whether or not there is room to increase the height of the table in the table printing region 23 regardless of whether or not there is a cell holding a formula that does not entirely fit within the cell. That is, the CPU 11 may judges whether or not there is room to increase the height of the table in the table printing region 23 regardless of the determination result in S218. In this case, if the width and height of a cell associated with a formula are increased, the entire formula can be made to fit within the cell without having to reduce the character size or with a smaller degree of reduction in the character size. Accordingly, the user can easily confirm the formula in the table.

Further, in the first embodiment, the user of the printer 1 can set the printing format in advance to indicate whether to print formulas or calculated results obtained based on the formulas in cells associated with the formulas. However, the user of the printer 1 may also be allowed to select the printing format at the beginning of each printing operation.

In the second embodiment, the formula indicating table and the calculated result indicating table are printed on one recording sheet. However, the printer 1 may be configured to print the formula indicating table on one page and the calculated result indicating table on another page. Then, the page for the formula indicating table and the page for the calculated result indicating table may be printed on one recording sheet.

For example, the printer 1 may be provided with a 2-in-1 printing function for printing two pages of content on one recording sheet, whereby the formula indicating table is printed as the first page in the recording sheet and the calculated result indicating table is printed as the second page in the same recording sheet. Since the formula indicating table and the calculated result indicating table can be printed on one recording sheet, the user can more easily compare data in these tables.

Further, the printer 1 receives table data from the USB memory 20 in the preferred embodiment. However, the printer 1 may receive the table data from a personal computer (not shown) or a data server (not shown) connected to a network (not shown). Further, the printer 1 may receive the table data from a personal computer (not shown) connected to the printer 1.

The above embodiments of the present invention are described based on the printer 1. However, the present invention may be applied to a terminal device, such as a personal computer, that is configured to process table data and create print data according to the methods in the above embodiments. The present invention may be applied to a printer driver that processes table data and creates print data according to the methods in the above embodiments. In these cases, a printer receives the print data from the terminal device or the printer driver and prints a table based on the print data. Thus, the printer can acquire a table having cells large enough to fit entire formulas without having to perform the cell size determining process.

What is claimed is:

1. A table data processing apparatus comprising:
    an input unit that receives table data describing a table including a plurality of cells, each of the plurality of cells having a size;
    a cell size changing unit that is configured to be capable of changing the size of a cell that is associated with a formula; and
    a print data creating unit that, if the cell size changing unit changes the size of the cell, creates print data for printing a cell-size changed table that includes the size changed cell in a predetermined part of a recording sheet such that the formula fits entirely within the size changed cell;
    wherein the table data further describes a first size of characters that constitutes the formula,
    wherein the table data processing apparatus further comprises:
    a magnification ratio setting unit that sets a magnification ratio, by which the table fits entirely within the predetermined part of the recording sheet; and
    a table size determining unit that determines a size of the table by the magnification ratio,
    wherein the cell size changing unit includes:
    a judging unit that judges whether or not the formula associated with the cell fits entirely within the cell if the table, whose size is determined by the table size determining unit, is printed in the recording sheet and the characters constituting the formula are printed at the first size;
    a margin detecting unit that, if the judging unit determines that the entire formula fails to fit within the cell, judges whether or not there will be any margin in the predetermined part of the recording sheet if the table, whose size is determined by the table size determining unit, is printed in the predetermined part of the recording sheet; and
    a cell-size increasing unit that, if the margin detecting unit determines that there will be a margin in the predetermined part of the recording sheet, increases the size of the cell in the table, whose size is determined by the table size determining unit, to a size that is no greater than a maximum size beyond which the table having the size-increased cell no longer fits within an entire area of the predetermined part of the recording sheet, wherein the print data creating unit includes a character size setting unit that sets a second size of the characters constituting the formula such that the entire formula fits within the size-increased cell, wherein the print data creating unit creates table data for printing the table having the size-increased cell within which the formula constituted by the characters having the second size fits.

2. The table data processing apparatus according to claim 1, wherein the plurality of cells are arranged in a plurality of rows and in a plurality of columns, the rows being arranged in a lengthwise direction of the recording sheet and the columns being arranged in a widthwise direction of the recording sheet, each cell having a width in the widthwise direction, and wherein, if the margin detecting unit determines that there is some margin in the predetermined part of the recording sheet on either side of the table, whose size is determined by the table size determining unit, in the widthwise direction, the cell-size increasing unit increases the widths of all cells of a column that includes the cell by an amount that is no greater than a width of the margin in the widthwise direction.

3. The table data processing apparatus according to claim 2, wherein each cell having a height in the lengthwise direction, wherein, if the margin detecting unit detects that there is some margin in the predetermined part of the recording sheet above and below the table, whose size is determined by the table size determining unit, in the lengthwise direction, the cell-size increasing unit increases the heights of all cells of a row that includes the cell by an amount that is no greater than a height of the margin in the lengthwise direction.

4. The table data processing apparatus according to claim 1, wherein the cell size changing unit further includes:

a cell-size not-increasing unit that maintains unchanged the size of the cell in the table, whose size is determined by the table size determining unit, if the margin detecting unit detects that the table, whose size is determined by the table size determining unit, has no margin in the predetermined part of the recording sheet; and wherein the character size setting unit that sets a third size of the characters such that the entire formula constituted by the characters fits within the size-unchanged cell, wherein the print data creating unit creates print data for printing the cell-size unchanged table obtained by the cell-size not-increasing unit, the cell-size unchanged table including the formula constituted by the characters having the third size.

5. The table data processing apparatus according to claim 1, further comprising a printing unit that prints the cell-size changed table having the size-increased cell based on the table data in the predetermined part of the recording sheet.

6. The table data processing apparatus according to claim 5, wherein the print data creating unit further creates print data for printing a calculated result indicating table in the recording sheet, the calculated result indicating table having a plurality of cells in one to one correspondence with the plurality of cells in the modified table, the calculated result indicating table having a cell which corresponds to the cell associated with the formula in the cell-size changed table and within which a formula result obtained based on the formula is printed, wherein the printing unit prints the calculated result indicating table based on the print data on the recording sheet.

7. The table data processing apparatus according to claim 6, wherein each of cells in the calculated result indicating table has a size the same as that of the corresponding cell in the cell-size changed table.

8. The table processing apparatus according to claim 5, wherein the print data creating unit creates setting data indicating settings established for the table data, the printing unit printing the settings based on the setting data on the recording sheet.

9. A table data processing apparatus comprising:

an input unit that receives table data describing a table including a plurality of cells, each of the plurality of cells having a size;

a cell-size changing unit that is configured to be capable of changing the size of a cell that is associated with a formula;

a print data creating unit that, if the cell-size changing unit changes the size of the cell, creates print data for printing a cell-size changed table that includes the size changed cell in a predetermined part of a recording sheet such that the formula fits entirely within the size changed cell; and a formula cell judging unit that judges whether or not the table has at least one cell associated with a formula;

wherein the print data creating unit creates information data representing information indicating that the table has no cell associated with a formula if the formula cell judging unit judges the table has no cell associated with a formula, the printing unit printing the information based on the information data on the recording sheet, and wherein the cell size changing unit includes:

a judging unit that, if the formula cell judging unit determines that the table has at least one cell associated with a formula, judges whether or not to change the size of the at least one cell associated with the formula, the cell size changing unit changing the size of the at least one formula-associated cell if the judging unit determines to change the size of the at least one formula-associated cell.

10. A non-transitory computer readable storage medium storing a set of program instructions installed on and executed by a computer for creating print data, the program instructions comprising:

receiving table data describing a table including a plurality of cells, each of the plurality of cells having a size;

changing the size of a cell that is associated with a formula;

creating print data for printing a cell-size changed table that includes the size changed cell in a predetermined part of a recording sheet such that the formula fits entirely within the size changed cell; and setting a magnification ratio, by which the table fits entirely within a predetermined part of the recording sheet;

determining a size of the table by the magnification ratio;

judging whether or not the formula associated with the cell fits entirely within the cell if the table, whose size is determined, is printed in the recording sheet and the characters constituting the formula being described in the table data;

judging, if the entire formula fails to fit within the cell, whether or not there will be any margin in the predetermined part of the recording sheet if the table, whose size is determined, is printed in the predetermined part of the recording sheet; and increasing, if there will be a margin in the predetermined part of the recording sheet, the size of the cell in the table, whose size is determined, to a size that is no greater than a maximum size beyond which the table having the size-increased cell no longer fits within an entire area of the predetermined part of the recording sheet; and setting a second size of the characters constituting the formula such that the entire formula fits within the size-increased cell;

wherein the creating creates creating table data for printing the table having the size-increased cell within which the formula constituted by the characters having the second size fits.

11. The non-transitory computer readable storage medium according to claim 10, the program instructions further comprising transmitting the created print data to a printer.

* * * * *